United States Patent
Gillespie

[11] Patent Number: 5,833,036
[45] Date of Patent: Nov. 10, 1998

[54] REBOUND ADJUSTABLE SHOCK ABSORBER

[75] Inventor: George T. Gillespie, Marietta, Ga.

[73] Assignee: Pro-Formance Shocks, Inc., Lawrenceville, Calif.

[21] Appl. No.: 618,989

[22] Filed: Mar. 20, 1996

[51] Int. Cl.[6] ....................................................... F16F 9/48
[52] U.S. Cl. .......................................... 188/285; 188/315
[58] Field of Search ..................................... 188/285, 286, 188/287, 314, 299, 315, 319, 322.13, 322.14; 280/707, 714; 267/64.18, 64.22, 166

[56] References Cited

U.S. PATENT DOCUMENTS

| | | | |
|---|---|---|---|
| 2,025,199 | 12/1935 | Funston | 188/315 |
| 3,003,595 | 10/1961 | Patriquin | 188/287 |
| 3,173,671 | 3/1965 | Broadwell | 188/315 |
| 3,478,846 | 11/1969 | Germond | 188/287 |
| 3,677,561 | 7/1972 | McNally . | |
| 3,874,485 | 4/1975 | Smith | 188/315 |
| 3,945,663 | 3/1976 | Duckett | 188/315 |
| 3,997,037 | 12/1976 | Schupner . | |
| 3,998,302 | 12/1976 | Schupner . | |
| 4,071,122 | 1/1978 | Schupner . | |
| 4,077,619 | 3/1978 | Borlinghaus | 267/166 |
| 4,122,923 | 10/1978 | Ellis et al. . | |
| 4,131,266 | 12/1978 | Carter . | |
| 4,164,274 | 8/1979 | Schupner . | |
| 4,214,737 | 7/1980 | Blatt . | |
| 4,742,898 | 5/1988 | Lee | 188/287 |
| 5,152,379 | 10/1992 | Sackett et al. . | |
| 5,172,794 | 12/1992 | Ward . | |
| 5,332,068 | 7/1994 | Richardson et al. . | |

FOREIGN PATENT DOCUMENTS 0063028   5/1980   Japan ..................................... 188/285

OTHER PUBLICATIONS

Gabriel Shock Absorber Design Manual; Gabriel of Canada, Ltd., Toronto, Ontario, Canada, pp. 1–51.
Konic catalog 1992–93, Koni–America, Inc.; Florence, Kentucky, pp. 1–64.

Primary Examiner—Robert J. Oberleitner
Assistant Examiner—Chris Schwartz
Attorney, Agent, or Firm—Hinkle & Associates, P.C.

[57] ABSTRACT

An adjustable rebound damping shock absorber (10) has an inner cylinder (14) disposed within and spaced radially from an outer cylinder (13) to form a reservoir (20) therebetween, a piston assembly (15) slidably disposed within the inner cylinder, a piston rod (16) extending from the piston assembly through a first end (11) of the inner and outer cylinders, and a closure (17). The closure has a fluid flow path providing fluid communication between a rebound chamber (36) and the reservoir. The fluid flow path has a variable jet (88), a variable orifice (85) and a variable spring (86) actuated damping valve (87) for controlling fluid flow from the rebound chamber and the reservoir. The jet, the orifice, the spring rate and damping valve are simultaneously adjustable by an adjusting pin (73). The variable spring has a tapered portion which varies in outside diameter from one end of the portion to the other end of the portion, creating a variable spring rate. Due to the variable spring rate, the variable damping valve is more responsive at lower piston assembly travelling speeds, providing "soft" damping control due to the relatively low pressure applied to the valve seat (72) by the variable spring.

31 Claims, 4 Drawing Sheets

REBOUND ADJUSTABLE SHOCK ABSORBER

BACKGROUND OF THE INVENTION

I. Field of the Invention

The present invention relates generally to the field of piston and cylinder type shock absorbers. More particularly, the present invention relates to a shock absorber which has a variable rebound damping assembly independent of a piston assembly for use with automobiles, off-road vehicles, racing vehicles and motorcycles.

II. Description of the Prior Art

Various piston-type fluid filled shock absorbers have included apparatus for adjusting or controllably varying the shock absorbers' damping characteristics or cushioning effects during compression or rebound of the shock absorber. When the vehicle's springs compress, as occurs when the vehicle wheels strike a roadway elevation, the pistons of the shock absorbers move in their compression stroke, downwardly in the cylinders of the shock absorbers. When the vehicle's springs expand, the pistons of the shock absorbers move in their rebound stroke, upwardly in the cylinders.

Typically, fluid enters and leaves a compression chamber and rebound chamber formed in the cylinder as a piston travels in the cylinder in response to an external shock. The fluid either travels through various fluid paths in the piston or a piston rod or through a passage or passages that provide fluid communication between the chambers and a reservoir. Additionally, these shock absorbers include means for selectively opening, closing or restricting the paths or passages to control the fluid rate in which the fluid enters or leaves the chambers. By controlling this fluid rate, the speed of the piston travelling in the cylinder is also controlled.

The greater the degree to which the flow of fluid within the rebound chamber or the compression chamber is restricted, the greater the damping forces which are provided by the shock absorber. Accordingly, when the flow of fluid is relatively unrestricted between the rebound chamber and the reservoir, a "soft" rebound stroke is produced. Likewise, when the flow of fluid is restricted between the rebound chamber and the reservoir, a "firm" rebound stroke is produced.

An example of the means for selectively opening, closing or restricting the paths or passages to control the fluid rate in which the fluid enters or leaves the chambers are spring-loaded valves. These valves unseat only after a predetermined fluid pressure builds up in the compression or rebound chambers which overcomes the spring load and are generally located in the piston or a piston assembly. These shock absorbers can be adjusted to increase or decrease the spring pressure on the valve seat, but requires the removal of the shock absorber from the vehicle, the collapsing of the shock absorber, rotation of the piston against a retaining mechanism and reinstallation of the shock absorber on the vehicle. Others require careful adjustment and securing of the mechanism.

Because different driving characteristics depend upon the amount of damping forces the shock absorber provides, it is often desirable to have a shock absorber in which the amount of damping forces generated by the shock absorber is adjustable. A high degree of adjustability of the shock absorber is highly effective when the track or road conditions are predicable and when the mechanic making the adjustment is thoroughly familiar with the effects of the adjustment. However, it has been difficult to provide means for accurately adjusting the spring load acting on the valve without greatly increasing the cost of the shock absorber. A shock absorber of this design, when adjusted to a "firm" rebound setting, limits the effects of slow speed damping due to the compression of the spring having a constant spring rate.

A shock absorber described in U.S. Pat. No. 3,677,561 by McNally has a cylinder disposed within a casing and spaced radially to form a reservoir and a piston slidably disposed in the cylinder. To control rebound damping, the piston is provided with a two-setting adjustable fluid passage having an orifice and spring actuated valve, which are adjustable by manually collapsing the shock absorber and rotating the parts thereof. By rotating the shock absorber, the cross-sectional fluid flow area of the orifice and the spring pressure on a valve seat are modified.

U.S. Pat. No. 4,131,266 granted to Carter described a piston sleeve disposed within a housing to form a radially spaced accumulator chamber, a piston slidably disposed in the cylinder and a metering valve to control compression damping. The metering valve has an adjustable valve member that engages a valve seat to restrict fluid flow.

An adjustable shock absorber described in U.S. Pat. No. 5,152,379 by Sackett et al includes a cylinder disposed within a reserve tube which forms a reservoir and a piston slidably movable within the chamber. The piston has a floating disk valve slidably disposed in a fluid reserve chamber for movement between first and second positions to selectively vary the resistance to fluid moving through the piston and a solenoid-plunger to actuate the disk valve.

As described in U.S. Pat. No. 5,172,794 by Ward, an adjustable damping shock absorber has a piston and cylinder type shock absorber that utilizes an externally controlled flow path between the rebound chamber and the reservoir. Fluid through the flow path is metered by a three-setting valve that interacts with three bores through an inner cylinder head which provide fluid communication between the reservoir and the rebound chamber.

SUMMARY OF THE INVENTION

In accordance with the present invention and the contemplate problems which have and continue to exist in this field, the objectives of this invention are to provide an adjustable rebound damping shock absorber which provides:

an improved piston and cylinder type shock absorber wherein its rebound damping characteristics may be readily and quickly changed from outside the shock absorber;

a shock absorber which is adaptable to a wide variety of adjustment actuation applications;

a shock absorber having a rebound damping adjustment from "soft" to "firm" and maintain a desired slow speed acceleration ramp, blow-off curve and high speed acceleration ramp at a desired setting;

enhanced road holding and handling by rapidly changing between "soft" to "firm" rebound conditions;

a simplified piston assembly by reducing both the number and complexity of the components thereof needed to control the damping forces;

variable compression damping with a piston assembly that has a fixed compression damping characteristic;

a closure having a fluid flow path for fluid communication between a rebound chamber and a reservoir regulated by a variable jet, a variable orifice and a variable spring actuated valve;

an adjustable rebound shock absorber which is adjustable while the shock is mounted to a vehicle; and a simple and efficient design which results in ease of manufacture and reduced production costs.

This invention accomplishes the above and other objectives with an adjustable rebound damping shock absorber that is externally adjustable. The shock absorber has an inner cylinder disposed within an outer cylinder and spaced radially to form a reservoir, a piston assembly slidably disposed in the inner cylinder, a piston rod extending from the piston assembly through a first end of the inner and outer cylinders, and a closure. A compression chamber is created between the piston assembly and a second end of the inner chamber, and a rebound chamber is created between the piston and the first end of the inner cylinder. To close a second end of the inner cylinder, a header having a means for fluid communication between the compression chamber and the reservoir is provided.

The closure has a fluid flow path providing fluid communication between the rebound chamber and the reservoir. Within the fluid flow path are a variable jet, a variable orifice and a variable spring actuated damping valve for controlling fluid flow from the rebound chamber and the reservoir. The variable spring has portion which varies in outside diameter from one end of the portion to the other end of the portion.

Enabling the external adjustment of the jet, the orifice and the damping valve, the closure is provided with an adjusting pin. The adjusting pin has a spring seat, a first tapered section and a second tapered section. To change the damping characteristic of the damping valve, the spring seat engages the variable spring to change the spring pressure on a valve seat and control a rebound opening pressure of the damping valve. As the spring is collapsed, the rebound opening pressure rises. Due to the variable spring rate of the spring, the variable valve is more response at lower piston travelling speeds, providing "soft" damping control regardless of the spring pressure on the valve seat. The orifice has a cross-sectional flow area and the adjusting pin has a first tapered section inserted through the orifice in a fluid metering relationship that increases the orifice cross-sectional flow area as the rebound opening pressure of the damping valve decreases. To control fluid flow through the jet, the jet has a cross-sectional flow area and the adjusting pin has a second tapered section inserted through the jet in a fluid metering relationship that increases the jet cross-sectional flow area as the rebound opening pressure of the damping valve decreases. The variable jet, the variable orifice and the variable spring actuated damping valve are adjustable externally from the shock absorber and are adjusted simultaneously.

The piston assembly has a bypass valve and a check valve. At a predetermined compression chamber fluid pressure, the bypass valve enables fluid to flow from the compression chamber to the rebound chamber, controlling the compression damping. When the fluid pressure in the rebound chamber exceeds the fluid pressure in the compression chamber, the check valve closes, preventing fluid flow around the piston.

A gas bag having a volume of gas equal to the volume of fluid displace by the piston rod when fully extended into the inner cylinder is provided within the reservoir.

Other objects, advantages and capabilities of the invention will become apparent from the following description taken in conjunction with the accompanying drawings showing the preferred embodiment of the invention.

DESCRIPTION OF THE PREFERRED EMBODIMENT

Figures 1, 7:
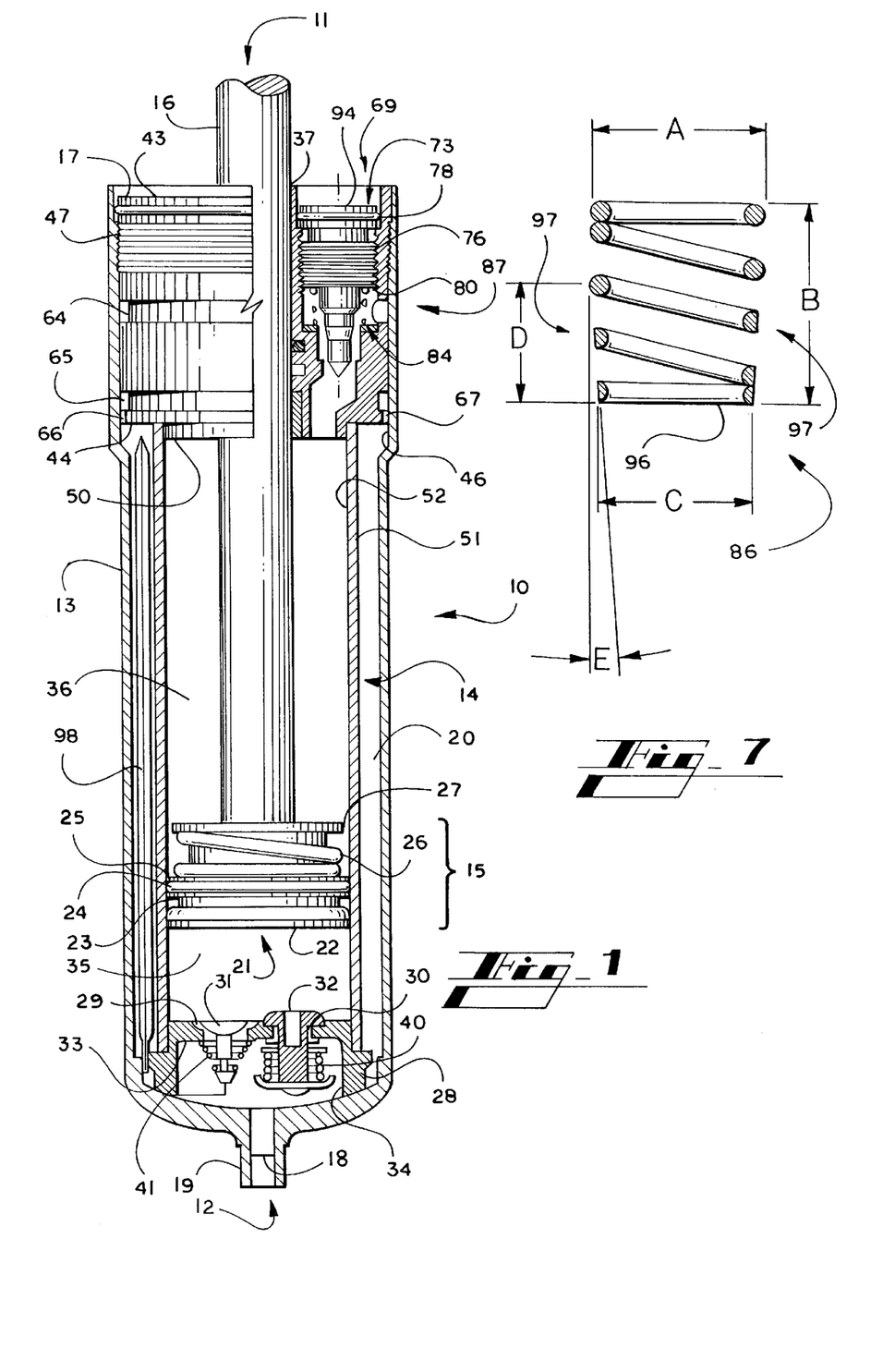
FIG. 1 is a partial cross-sectional elevation view of an adjustable rebound damping shock absorber.
FIG. 7 is a cross-sectional, elevation view of the variable spring.

Referring to the drawings wherein like reference numerals designate corresponding parts throughout the several figures, reference is made first to FIG. 1. An adjustable rebound damping shock absorber 10 is generally shown, and except as noted below, the structure of the shock absorber 10 is conventional. The shock absorber 10 has a first end 11, a second end 12, an outer cylinder 13, an inner cylinder 14, a piston assembly 15, a piston rod 16 and a closure 17. The design of the closure 17 is not conventional.

The second end 12 of the outer cylinder 13 has a general cup-shape and is sealed by an end plate 18. A threaded mounting member 19 adaptable to be removably connected to a first part of a motor vehicle wheel system is provided. At the first end 11 of the shock absorber 10, the piston rod 16 extends beyond the first end 11 and has a threaded distal end (not shown) which is also adaptable to be removably connected to a second part of the motor vehicle wheel system. Both connections to the motor vehicle wheel system are conventional, and the details of such connections do not form part of this invention.

The outer cylinder 13 surrounds the inner cylinder 14 so that the longitudinal axes of the cylinders 13 and 14 are coincident. A fluid reservoir 20 is defined within the annular volume between the inner cylinder 14 and the outer cylinder 13. A conventional gas bag 98 is disposed within the reservoir 20. The gas bag 98 has a volume of gas generally equal to a volume of fluid displaced by the piston rod 16 when fully extended into the inner cylinder 14.

The piston assembly 15 is disposed within the inner cylinder 14 and adjustably mounted to the piston rod 16 at a piston assembly receiving end 21. Comprising the piston assembly are a piston 22, a check valve 23, an annular seal ring 24, an annular seal ring carrier 25, a bypass spring 26 and a spring abutment plate 27, as shown in both FIGS. 1 and 8. The piston assembly 15 is adapted to be reciprocally moved, parallel with the longitudinal axis of the inner cylinder 14 and within the inner cylinder 14.

The first end 11 and the second end 12 of the inner cylinder 14 are provided with a closed arrangement. Connected to and closing the second end 12 of the inner cylinder 14 is an inverted cup-shaped, valve cage member which forms a header 28 for the inner cylinder 14. The header 28 has a replenishing passage 29 and an impact passage 30 and carries a replenishing valve 31 and an impact valve 32. Mounted onto the header 28 and engaging the replenishing passage 29 is the replenishing valve 31. Similarly, the impact valve 32 is mounted onto the header and engages the impact passage 30. Facing the second end 12 of the outer cylinder 13, the header 28 has a second side 33 and a header wall 34. Disposed through the header wall 34 are a first fluid port (not shown) and a second fluid port (not shown). The closure 17 engages and closes the first end 11 of the inner cylinder 14.

The piston assembly 15 separates the inner cylinder 14 into two working chambers. A compression chamber 35 is defined within the inner cylinder 14 between the header 28 and the header-facing side of the piston assembly 15. A rebound chamber 36 is defined within the inner cylinder 14 between the closure 17 and the closure-facing side of the piston 22.

Figure 3:
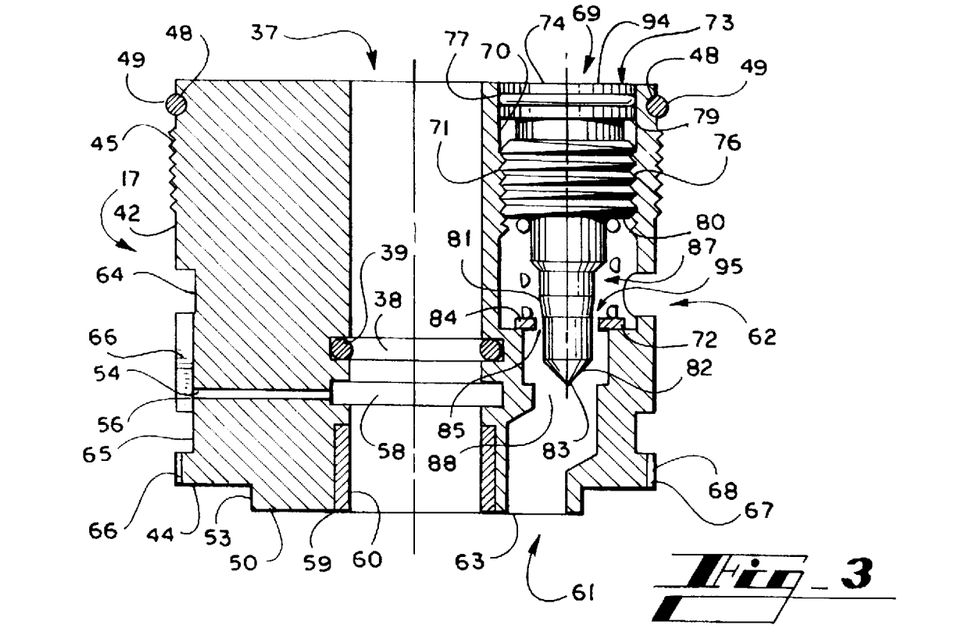
FIG. 3 is a cross-sectional view of the closure with the adjusting pin fully retracted.
Figure 4:
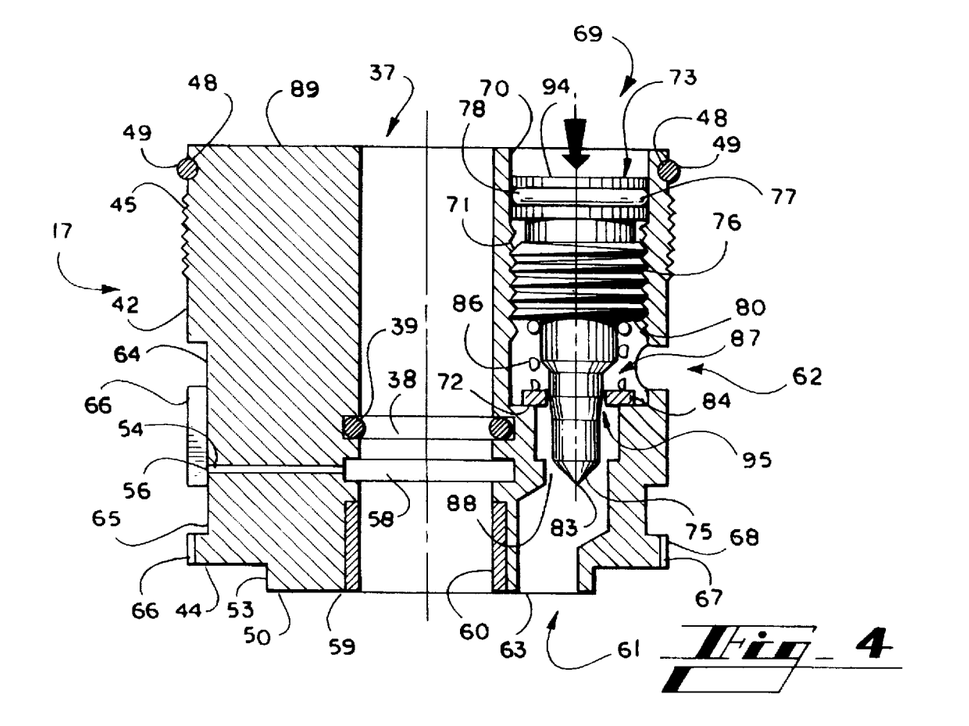
FIG. 4 is a cross-sectional view of the closure with the adjusting pin fully extended.

As previously noted, the piston rod 16 is connected and moves with the piston assembly 15. The piston rod 16 extends into the rebound chamber 36 and projects through a central, close fitting aperture 37 in the closure 17. A rod seal groove 38 is provided in the aperture 37 which is perpendicular to the longitudinal axis of the closure 17 to secure a rod seal O-ring 39, as shown in FIGS. 3 and 4. The rod seal O-ring 39 slidably and sealably engages the piston rod 16 to prevent leakage of fluid through the aperture 37 at the first end 11 of the shock absorber 10. The longitudinal axis of the piston rod 16 and the aperture 37 are coaxial with the longitudinal axis of the inner cylinder 14.

In normal usage, the reciprocal compression and rebound motion of the piston assembly 15 within the inner cylinder 14 is controlled by the rate at which fluid is allowed to flow into and out of the chambers 35 and 36. The impact valve 32, or blow-off valve, has an impact spring 40 to bias the impact valve 32 in its closed position. During the compression or downward stroke of the piston assembly 15, fluid will flow from the compression chamber 35 through the impact valve 32 when a predetermined fluid pressure occurs in the compression chamber 35 and thence through the first and second fluid ports of the header 28 and into the reservoir 20. The replenishing valve 31 has a replenishing spring 41 which biases the replenishing valve 31 toward its closed position. During the rebound or upward stroke of the piston assembly 15 with respect to the header 28, fluid pressure in the reservoir 20, that exceeds the pressure in the compression chamber 35 by an amount greater than that required to overcome the preset closing bias of the replenishing spring 41, causes the replenishing valve 31 to unseat and open to an extent proportional to the amount that the spring closing bias is exceeded. Fluid then flows from the reservoir 20 through the first and second fluid ports of the header 28, through the replenishing valve 31 and into the compression chamber 35 below the upwardly moving piston assembly 15.

Figures 2, 8, 9:
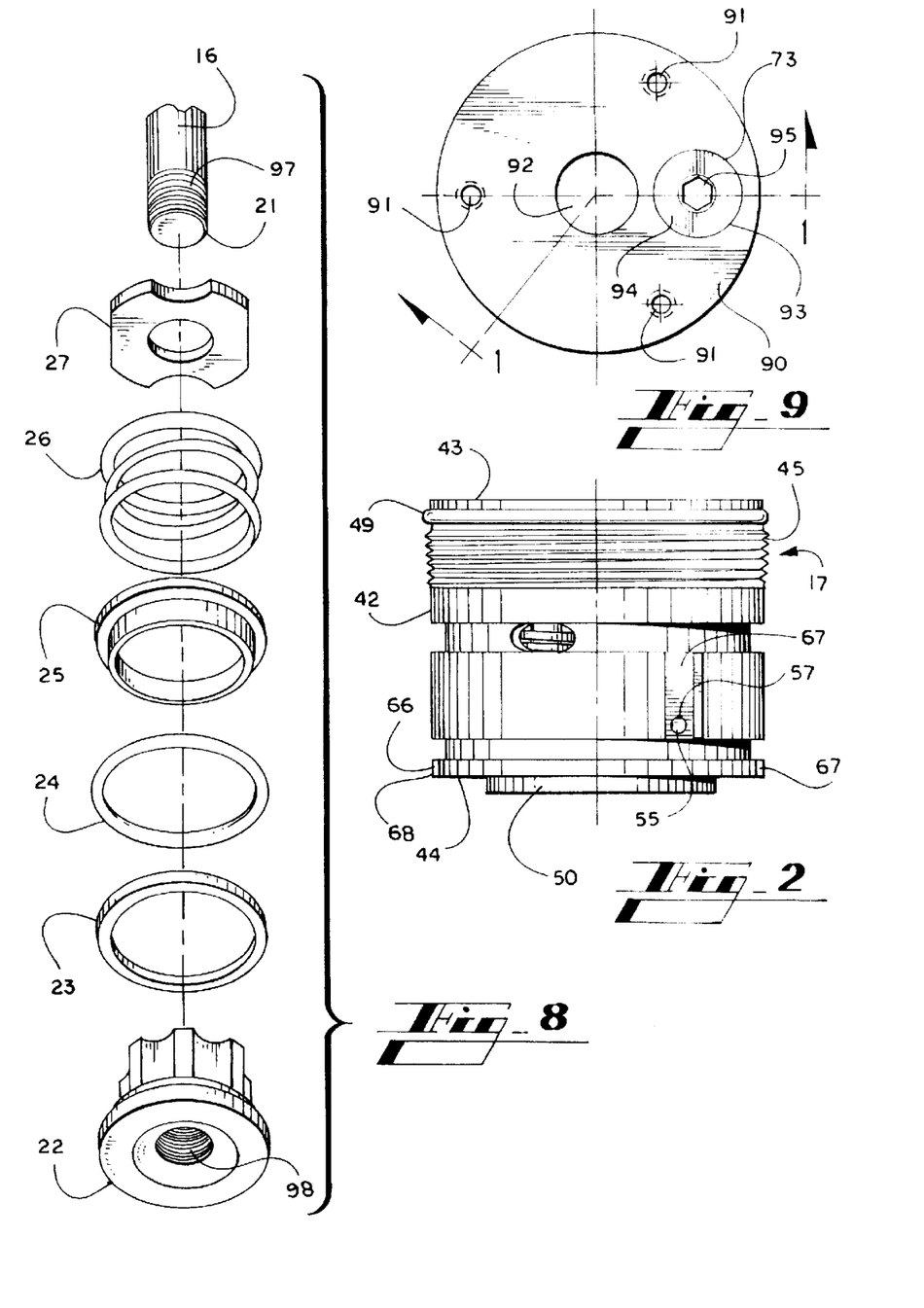
FIG. 2 is an elevation view of a closure.
FIG. 8 is an exploded, perspective view of the piston assembly.
FIG. 9 is a top view of a stop plate mounted on the closure.

As noted, the closure 17 is unconventional and in addition to FIG. 1, reference is generally made to FIG. 2. The closure 17 is cylindrical, has an outer peripheral surface 42, a top side 43, a bottom side 44 and disposed in the first end 11 of the shock absorber 10. The centrally disposed aperture 37 is along the longitudinal axis of the closure 17 through which the piston rod 16 may sealingly slide. The aperture 37, the outer cylinder 13, the inner cylinder 14 and the piston rod 16 are coaxial.

Near the top side 43 and on the outer peripheral surface 42 of the closure 17 is a threaded portion 45. Likewise, the outer cylinder 13 has a wall 46 with an inner threaded section 47 at the first end 11. The threaded portion 45 of the closure 17 engages the threaded section 47 of the outer cylinder 13 and provides contact between the outer peripheral surface 42 of the closure 17 and the wall 46 of the outer cylinder 13. Between the threaded portion 45 and the top side 43 and on the outer peripheral surface 42 of the closure 17 is an annular end groove 48. Disposed within the end groove 48 and sealably engaging the wall 46 of the outer cylinder 13 is a closure seal O-ring 49. The closure seal O-ring 49 prevents the leakage of fluid out of the first end 11 of the outer cylinder 13.

When the closure 17 is placed in sealable engagement with the outer cylinder 13, the closure 17 also sealably engages the inner cylinder 14, which has an inner cylinder wall 51 and an inner surface 52, for preventing the leakage of fluid from the first end 11 of the inner cylinder 14 into the reservoir 20. This is accomplished by a circular closure flange 50 sealably engaging the first end 11 of the inner cylinder 14. The flange 50 extends from the bottom side 44 of the closure 17 to form a side wall 53 and is concentric with the aperture 37. The side wall 53 diameter and the inside diameter of the inner cylinder 14 are equal. The flange 50 has a beveled edge (not shown). As the closure 17 is screwed into the outer cylinder 13, the flange side wall 53 inserts into and engages the inner surface 52 of the inner cylinder 14 by surface-to-surface contact. The closure 17 is in place when the bottom side 44 comes in contact with the first end 11 of the inner cylinder 14, seating the flange 50 in sealable engagement against the first end 11 of the inner cylinder 14.

With reference now to FIGS. 2, 3 and 4, a first fluid passage 54 and a second fluid passage 55 are provided in the closure 17 along an axis perpendicular to the longitudinal axis of the closure 17 by means of a first radial port 56 and a second radial port 57, respectively, for establishing fluid communication between the rebound chamber 36 and the reservoir 20. Fluid communication between the rebound chamber 36 and the reservoir 20 is further described below. Both fluid passages 54 and 55 intersect a fluid groove 58 provided in the aperture 37 which is perpendicular to the longitudinal axis of the closure 17 and between the rod seal groove 38 and the bottom side 44. Because of the size of the fluid groove 58, the fluid passages 54 and 55 and the space between the piston rod 16 and the closure 17 within the aperture 37, fluid flow is greatly restricted.

A sleeve slot 59 is provided in the aperture 37 at the bottom side 44 of the closure 17. Mounted within the sleeve slot 59 is a Teflon® coated sleeve 60 to slidably engage the piston rod 16.

A rebound control passage 61 is disposed within the closure 17 to provide controlled fluid communication between the rebound chamber 36 and the reservoir 20. The rebound control passage 61 has a radial reservoir port 62 and a longitudinal rebound port 63. The reservoir port 62, which is in fluid communication with the reservoir 20, opens within an annular first groove 64. In fluid communication with the first groove 64 is an annular second groove 65. Connecting the first groove 64 and second groove 65 are a first port groove 66 and a second port groove 67. Within the first port groove 66 and the second port groove 67 are the first radial port 56 and the second radial port 57, respectively. Between the second groove 65 and the bottom side 44 is a reservoir header 68. The outside diameter of the reservoir header 68 is less than the outside diameter of the top side 43 of the closure 17 thereby enabling fluid passage between the first and second grooves 64 and 65 and the reservoir 20 through the space between the reservoir header 68 and the outer cylinder 13. Opening within the flange 50 is the rebound port 63. This provides fluid communication from the rebound chamber 36 through the rebound control passage 61 to the reservoir 20 via the first and second grooves 64 and 65 and the first and second port grooves 66 and 67. Likewise, there is fluid communication between the rebound chamber 36 and the reservoir 20 through the aperture 37, the first and second fluid passages 54 and 55, the first and second grooves 64 and 65, and the first and second port grooves 66 and 67 through the space between the reservoir header 68 and the outer cylinder 13.

A bore 69 having a bore wall 70 a threaded section 71 extending from the bore wall 70 is disposed along a longitudinal axis parallel to the longitudinal axis of the aperture 37 through the top side 44 of the closure 17. The bore 69 intersects the rebound control passage 61 and terminates at a valve seat 72.

Within the bore 69 is a coaxial, cylindrical adjusting pin 73 having a carrier end 74 and a jet end 75. The adjusting pin 73 has a threaded portion 76 movably engaging the threaded section 71 of the bore 69. A circumferential pin O-ring carrier 77 extends from the adjusting pin 72 at the carrier end 74. Residing around the pin O-ring carrier 75 and sealably engaging the bore wall 70 is a pin O-ring 78 which thereby prevents the leakage of fluid from the bore 69 out of the first end 11 of the shock absorber 10. The pin O-ring carrier 75 has a pin stop 79 acting in conjunction with the threaded section 71 as a barrier to limit the movement of the adjusting pin in the direction of the valve seat 72. Turning the adjusting pin 73 in a clockwise manner causes the adjusting pin 73 to move in the direction of the valve seat 72. Travel of the adjusting pin 73 may continue in this direction until the pin stop 79 engages the threaded section 71 of the bore 69. Adjacent to the threaded portion 74, the outside diameter of the adjusting pin 73 is reduced, and the adjusting pin 73 forms a spring seat 80. Continuing in the direction of the jet end 75 from the threaded portion 76, the adjusting pin 73 has a first tapered section 81 which reduces in outside diameter along its longitudinal axis. At the jet end 75, the adjusting pin 73 has a second tapered section 82 which reduces in outside diameter along its longitudinal axis to form a jet end point 83.

Resting against the valve seat 72 is an orifice disk 84 having an orifice 85 which is coaxial and concentric with the bore 69. The first tapered section 81 of the adjusting pin 73 extends though the orifice disk 84. Because the orifice disk 84 has an orifice diameter greater than the largest diameter of the first tapered section 81, the orifice 85 remains open, thereby defining a variable low-speed bleed 95. A variable spring 86 is disposed around the adjusting pin 73 such that one end of the variable spring 86 engages the spring seat 80 and the other end of the variable spring 86 engages the orifice disk 84 causing the orifice disk 84 to exert pressure on the valve seat 72. The combination of the orifice disk 84, the variable spring 86, the valve seat 72 and the spring seat 80 forms a variable damping valve 87. The damping valve 87 is adapted to open when the fluid pressure in the rebound chamber 36 exceeds the fluid pressure in the reservoir 20 by a predetermined rebound opening pressure, causing the orifice disk 84 to lift from the valve seat 72 and enabling the fluid to primarily flow between the bore wall 70 and the orifice disk 84, which bypasses the orifice 85.

As the adjusting pin 73 moves within the bore 69, the cross-sectional flow area of the orifice 85 varies due to the movement of the first tapered section 81 of the adjusting pin 73 within the orifice 85 which in turn varies the rate of flow through the low-speed bleed 95. By varying the cross-sectional flow area of the orifice 85, the rebound damping characteristics of the shock absorber 10 are also varied.

Located between the valve seat 72 and the rebound port 63 within the rebound control passage 61 is a jet 88. The jet 88 is coaxial with and along the longitudinal axis of the bore 69. By turning the adjusting pin 73 in a clockwise manner, the jet end point 83 moves into the cross-sectional flow area of the jet 88. As the adjusting pin 73 continues in the direction of the jet 88, the second tapered section 82 of the adjusting pin 73 moves through the cross-sectional flow area of the jet 88 and decreases this cross-sectional flow area. Fluid flow through the jet 88 is not prevented due to the diameter of the cross-sectional flow area of the jet 88 being greater than the outside diameter of the adjusting pin 73 within the jet 88. As the cross-sectional flow area of the jet 88 is varied, the rebound damping characteristics of the shock absorber 10 likewise vary.

Along the longitudinal axis of the adjusting pin 73, the distance between the pin stop 79 and the threaded portion 76, the length of the first tapered section 81 and the length of the second tapered section 82 are equal. The distance between the first tapered section 81 and the second tapered section 82 is provided so that only the first tapered section 81 of the adjusting pin 73 engages the orifice 85, and only the second tapered section 82 of the adjusting pin 73 engages the jet 88.

As shown in FIG. 9, the top side 43 of the closure 17 has an outer surface 89. A stop plate 90 is removably mounted to the outer surface 89. In the preferred embodiment, the stop plate 90 is mounted by setting screws. Concentric with the aperture 37 is a stop plate opening 92 to enable the piston rod 16 to sidably move through the stop plate 90. Between the outer surface of the closure 89 and the stop plate 90 and within the stop plate opening is a dust seal (not shown) slidably engaging the piston rod 16. The dust seal is made of plastic and prevents dust, dirt and debris from entering the shock absorber 10. Adjacent to the adjusting pin 73, the stop plate 90 has a hole 93 with a diameter less than the outside diameter of the adjusting pin 73 at the carrier end 74. The stop plate 90 is provided to limit the travel of the adjusting pin 73 in the direction of the first end 11 of the shock absorber 10. At the carrier end 74, the adjusting pin 73 has a top surface 94. Both the stop plate 90 and the top surface 91 of the adjusting pin 73 have indicia (not shown) to indicate a level of rebound damping. Embedded within the top surface 94 of the adjusting pin 73 is a hollow set screw key (not shown) for turning the adjusting pin 73 within the bore 69.

To assist in heat transfer from the shock absorber 10 to the atmosphere, the closure 17 has a plurality of heat bores (not shown) within the closure 17. The heat bores have heat bore openings (not shown) at the outer surface 89.

Variable rebound damping control of the shock absorber 10 is maintained by contemporaneous adjustment of the damping valve 87, the low-speed bleed 95 and the jet 88. To a lesser extent the shock absorber 10 has compression damping control due to the cross-sectional flow areas of the orifice 85 and the jet 88 always remaining open. Although the variable spring 86 utilized in the damping valve 87 could have a constant spring rate, the preferred embodiment utilizes a unique variable spring 86 which has a variable spring rate. This contemporaneous combination of adjustments provides the shock absorber 10 adjustable damping on rebound from "soft" to "firm" and maintains the desired slow-speed acceleration ramp rebound control and high-speed acceleration ramp rebound control, regardless of setting. Even when the shock absorber 10 is set in the "firmest" position, the "soft" rebound damping control is maintained at slower vehicle speeds, or in other words, slower piston assembly 15 speeds within the inner cylinder 14. The shock absorber 10 is in the "softest" setting when the top surface 94 of the adjusting pin 73 is in contact with the stop plate 90. The "firmest" setting is when the pin stop 74 is in contact with the threaded section 71 of the bore 69.

Figure 5:
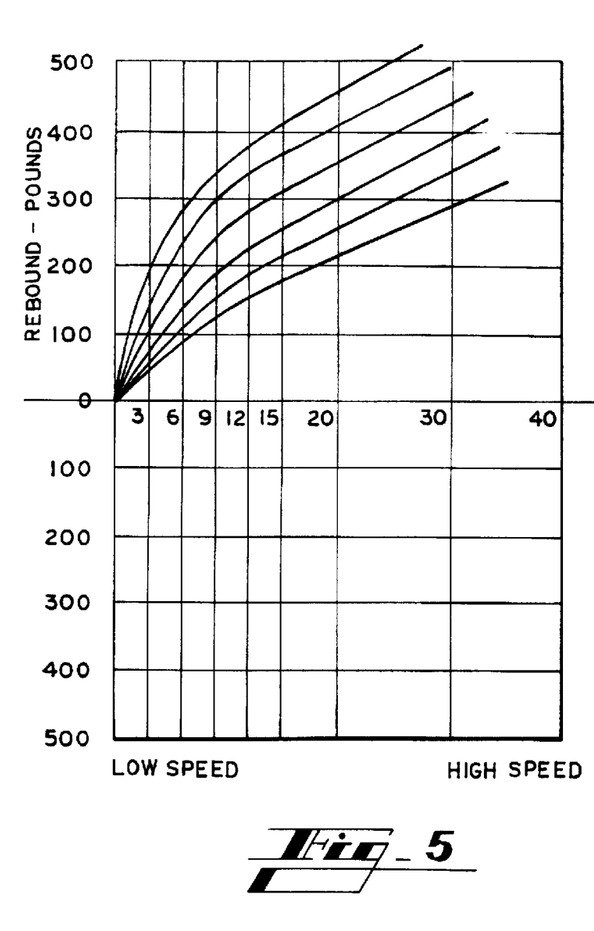
FIG. 5 is a graph showing the rebound damping curve at various rebound opening pressures of the adjustable rebound damping shock absorber.
Figure 6:
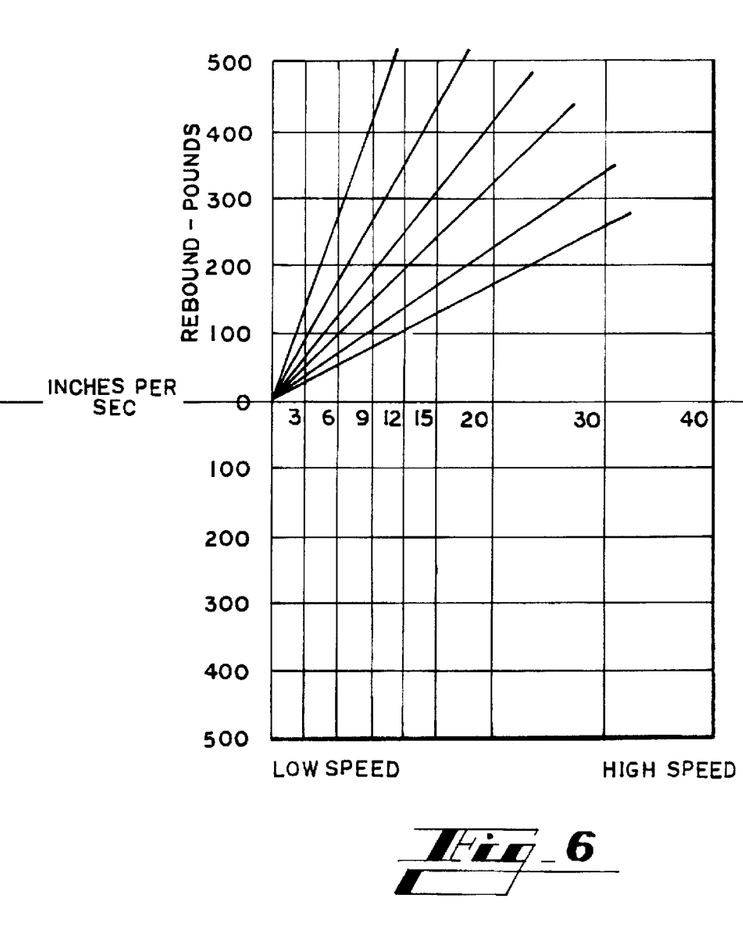
FIG. 6 is a graph showing the typical rebound damping curve of a shock absorber which only adjusts rebound opening pressure at various rebound opening pressures.

For purposes of comparison, FIGS. 5 and 6 are graphical representations of the rebound damping characteristics of the present invention and a typical shock absorber which has an adjustable damping valve seat pressure within its piston assembly, respectively. The magnitude of the rebound forces is illustrated relative to the velocity of piston travel relative to the rebound chamber with each plotted line designating the damping characteristics desired at various damping valve seat pressures. These figures show the rebound damping characteristic at slow piston assembly speeds being maintained by the present invention. Whereas, the rebound damping characteristic of the typical shock absorber at any piston assembly speed is linear and results in a less responsive rebound damping control, even at slower piston assembly speeds.

The superior rebound damping control is primarily due to the variable spring 86. FIG. 7 shows the variable spring 86 of the present invention. The variable spring 86 is manufactured by machining a taper 97 into a standard spring having an outside diameter of 0.480 inch and a spring length of 0.560 inch, represented by the alphanumerics "A" and "B", respectively. The wire diameter of the spring is 0.065 inch. As a result of the tapering process, the variable spring 86 has a tapered end 96 with an outside diameter of 0.410 inch, represented by the alphanumeric "C". The length of the taper along the longitudinal axis of the variable spring 86 is 0.325 inch, represented by the alphanumeric "D". This results in a taper of 13 degrees, represented by the alphanumeric "E", from the origin of the taper to the tapered end 96.

With additional reference to FIGS. 1, 3 and 4, and particularly to FIG. 7, the variable spring 86 has an inside diameter that does not vary along its length. Throughout the taper 97, however, not only does the outside diameter of the variable spring 86 vary, but, as shown in the drawings, the cross-sectional area, or diameter, of the wire comprising the variable spring 86 also varies. At the tapered end 96, the cross-sectional area, or diameter, of the wire is at its lowest value. Resultingly, the spring rate at the tapered end 96 is at its lowest value. Accordingly, the pressure applied to the valve seat 72 by the variable spring 86 is as well at its lowest value, enabling the damping valve 87 to provide "soft" rebound damping control at slower piston assembly 15 speeds even when the shock absorber 10 is set in the "firmest" position. As the speed of the piston assembly 15 increases, the fluid pressure from the rebound chamber 36 increases and tends to cause the orifice disk 84 to move further from the valve seat 72. As the orifice disk 84 moves away from the valve seat 72, the spring rate of the variable spring 86 accordingly increases non-linearly, as reflected in FIG. 5, which enables the damping valve 87 to offer more resistance to the fluid moving through the rebound control passage 61 from the rebound chamber 36.

Referring now to FIG. 8, fluid flow may occur between the compression and rebound chambers 35 and 36 through the piston assembly 15, which is removably mounted on the piston rod 16, acting as a conventional bypass valve. The piston assembly 15 allows fluid flow from the compression chamber 35 to the rebound chamber 36 when the fluid pressure in the compression chamber 35 exceeds fluid pressure in the rebound chamber 36 by a predetermined bypass pressure. The piston rod 16 has its piston assembly receiving end 21 threaded. Adjacent to the threads at the piston assembly receiving end 21 is a piston rod shoulder 97.

The piston assembly 15 comprises the spring abutment plate 27 engaging the piston rod shoulder 97. Next, the bypass spring 26 engages the spring abutment plate 27 at one end of the bypass spring 26. Engaging the other end of the bypass spring 26 is the annular seal ring carrier 25 with the annular seal ring 24 being carried by the carrier 25. The check valve 23 floats on the carrier 25 and engages the opposite side of the annular seal ring 24 with respect to the bypass spring 26. Finally, the piston 22 has a threaded opening 98 which engages both the threads of the piston rod 16 at the piston assembly receiving end 21 and the carrier 25.

Turning the piston 22 in a clockwise manner with the piston rod 16 stationary causes the bypass spring to collapse and assert pressure on the piston rod shoulder 97 through the spring abutment plate 27 and the piston through the carrier 25. The further the piston 22 moves toward the piston rod shoulder 97, the higher the fluid pressure is required within the compression chamber 35 to force the fluid bypass of the piston assembly 15, thus determinative of the fluid bypass force. Fluid pressure in the compression chamber 35 tends to urge the seal ring 24 and the carrier 25 against the bypass spring 26. When the pressure in the compression chamber 35 exceeds the combination of the predetermined bypass force of the bypass spring 26 and the fluid pressure in the rebound chamber 36, the seal ring 24 and the carrier 25 move away from the piston 22 and thereby open a fluid bypass path from the compression chamber 35 to the rebound chamber 36. When the fluid pressure in the rebound chamber 36 exceeds the fluid pressure in the compression chamber 35, the check valve seats against the piston 22 and blocks fluid flow from the rebound chamber 36 to the compression chamber 35.

The outer cylinder 13, the inner cylinder 14, the piston rod 16, the piston assembly except for the seal ring 24 and the bypass spring 26, the header 28 and the orifice disk 84 are made of steel. The closure 17 and the stop plate 90 are made of aluminum. The bypass spring 26 and the variable spring 86 are made of spring steel. All rings 24, 39, 49 and 76 are elastomeric O-rings.

It is foreseeable that the variable spring 86 can be manufactured from a wire having a variable diameter without utilizing the machining method described above. Also foreseeable is the variable spring 86 being manufactured with varying wire compositional components that yield a spring with the same variable spring rate.

The variable rebound damping control of the variable damping valve, variable orifice and variable jet, or any combination thereof, is foreseeably placeable within a fluid flow path disposed outside of the outer cylinder 13, within the inner cylinder 14 or within the reservoir 20.

Foreseeably, the adjusting pin 73 may be designed having a geared arrangement with a rotation device, either manually or by motorized means, for rotating the adjusting pin 73 within the bore 69. The bore 69 may foreseeably be manufactured without the threaded section 71 and the adjusting pin 73 within the bore 69 moved along the longitudinal axis of the bore 69 by mechanical actuation.

Various modifications may be made of the invention without departing from the scope thereof and it is desired, therefore, that only such limitations shall be placed thereon as are imposed by the prior art and which are set forth in the appended claims.

What is claimed is:

1. An adjustable shock absorber, comprising:
 an inner cylinder having a wall, a first end and a second end and defining a cylindrical volume between its first and second ends, the wall having an inner surface;

an outer cylinder having a greater diameter than the inner cylinder and disposed coaxially about the inner cylinder so as to define an annular reservoir between the inner and outer cylinders, the outer cylinder having a first end and a second end, adjacent to the first and second ends, respectively, of the inner cylinder, the second end of the outer cylinder being sealed, the outer cylinder having a wall;

a piston assembly disposed in the inner cylinder and adapted to be reciprocally movable therein, having a piston and with at least a portion of the piston assembly being in a slidable, fluid sealing relationship with the inner surface of the inner cylinder, the piston assembly also serving to divide the cylindrical volume so as to define a compression chamber between the piston assembly and the second end of the inner cylinder and a rebound chamber between the piston and the first end of the inner cylinder;

a piston rod extending from the piston assembly, coaxially with the longitudinal axis of the inner cylinder, beyond the first end of the inner and outer cylinders;

a header for closing the second end of the inner cylinder; the header having means for fluid communication between the compression chamber and the reservoir;

a closure extending across the first ends of the inner and outer cylinder, having a centrally disposed aperture therein through which the piston rod may sealingly slide, the closure sealably engaging the wall of the inner cylinder at the first end for preventing the leakage of fluid out of the first end of the inner cylinder into the reservoir, the closure including a first means sealably engaging the wall of the outer cylinder at the first end for preventing the leakage of fluid out of the first end of the outer cylinder, the closure including a second means around the piston rod for preventing the leakage of fluid out of the first end of the outer cylinder as the piston rod moves with the piston assembly;

a fluid flow path disposed between the rebound chamber and the reservoir permitting fluid communication;

a damping valve disposed within the fluid flow path adapted to open when the fluid pressure in the rebound chamber exceeds the fluid pressure in the reservoir by a predetermined rebound opening pressure;

variable rebound damping means for varying the rebound opening pressure of the damping valve; and adjustable low speed means disposed within the fluid flow path for metering the fluid flow between the rebound chamber and the reservoir when the fluid pressure in the rebound chamber both exceeds the fluid pressure in the reservoir and is less than the rebound opening pressure of the damping valve, said low speed means being contemporaneously adjusted as the rebound opening pressure of the damping valve is varied.

2. A shock absorber as claimed in claim 1, wherein:
the damping valve has a valve seat;
the closure has a threaded bore in communication with the fluid flow path; and
the variable rebound damping means comprises an adjusting pin having threads adjustably engaging the threads of the bore, the adjusting pin having a spring seat, and a variable spring disposed to engage the spring seat and assert pressure onto the valve seat.

3. A shock absorber as claimed in claim 2, wherein the low speed means further comprises the damping valve having an adjustable orifice for restricting low-velocity fluid flow between the rebound chamber and the reservoir.

4. A shock absorber as claimed in claim 3, wherein the low speed means further comprises the orifice having a cross-sectional area and the adjusting pin having a first tapered section inserted through the orifice in a fluid metering relationship and defining an orifice cross-sectional flow area, the orifice cross-sectional flow area contemporaneously increasing as the rebound opening pressure of the damping valve is decreased.

5. A shock absorber as claimed in claim 2, wherein the low speed means further comprises the fluid flow path having an adjustable jet disposed within the fluid flow path for metering the fluid flow between the rebound chamber and the reservoir.

6. A shock absorber as claimed in claim 5, wherein the low speed means further comprises the jet having a cross-sectional area and the adjusting pin having a second tapered section inserted through the jet in a fluid metering relationship and defining a jet cross-sectional flow area, the jet cross-sectional flow area contemporaneously increasing as the rebound opening pressure of the damping valve is decreased.

7. A shock absorber as claimed in claim 2, wherein the variable spring has a taper, and one end of the variable spring engages the spring seat and the other end of the variable spring asserts pressure onto the valve seat.

8. A shock absorber as claimed in claim 2, wherein the bore has a wall and the adjusting pin includes a third means around the adjusting pin for preventing the leakage of fluid out of the first end of the outer cylinder at the bore.

9. A shock absorber as claimed in claim 2, wherein the closure has an outer surface and further comprises a stop plate mounted to the outer surface of the closure for limiting the travel of the adjusting pin toward the first end.

10. A shock absorber as claimed in claim 2, wherein the adjusting pin has a top surface and further comprises indicia on the stop plate and the top surface of the adjusting pin to indicate a level of rebound damping.

11. A shock absorber as claimed in claim 1, wherein the damping valve has a valve seat and the variable rebound damping means comprises a variable spring and means for increasing spring pressure onto the valve seat.

12. A shock absorber as claimed in claim 11, wherein the closure has a threaded bore in communication with the fluid flow path and the means for increasing spring pressure onto the valve seat comprises an adjusting pin having threads adjustably engaging the threads of the bore, the adjusting pin having a spring seat, one end of the spring engaging the spring seat and the other end of the spring asserting pressure onto the valve seat.

13. A shock absorber as claimed in claim 12, wherein the closure has an outer surface and further comprises a stop plate mounted to the outer surface of the closure for limiting the travel of the adjusting pin toward the first end.

14. A shock absorber as claimed in claim 13, wherein the adjusting pin has a top surface and further comprises indicia on the stop plate and the top surface of the adjusting pin to indicate rebound damping.

15. A shock absorber as claimed in claim 12, wherein the bore has a wall and the adjusting pin includes a third means around the adjusting pin for preventing the leakage of fluid out of the first end of the outer cylinder at the bore.

16. A shock absorber as claimed in claim 11, wherein the variable spring is comprised of wire, the wire increasing in outside diameter from one end of the spring to the other end.

17. A shock absorber as claimed in claim 1, wherein the low speed means further comprises the fluid flow path having an adjustable jet for metering the fluid flow between the rebound chamber and the reservoir.

18. A shock absorber as claimed in claim 17, wherein the low speed means further comprises the jet having a cross-sectional flow area and the cross-sectional flow area of the jet adjustably increasing as the rebound opening pressure of the damping valve is variably decreased.

19. A shock absorber as claimed in claim 1, wherein the low speed means further comprises the damping valve having an adjustable orifice for restricting low-velocity fluid flow between the rebound chamber and the reservoir.

20. A shock absorber as claimed in claim 19, wherein the low speed means further comprises the orifice having a cross-sectional flow area and the cross-sectional flow area adjustably increasing as the rebound opening pressure of the damping valve is variably decreased.

21. A shock absorber as claimed in claim 1, wherein the means for fluid communication between the compression chamber and the reservoir comprises the header having a first fluid passage through the header and first valve means for controlling fluid flow through the first passage from the compression chamber to the reservoir when the piston assembly moves through a compression stroke and a second fluid passage through the header and second valve means for controlling fluid flow through the second passage from the reservoir to the compression chamber when the piston assembly moves through a rebound stroke.

22. A shock absorber as claimed in claim 1, wherein the piston assembly has a bypass passage communicating between the compression chamber and the rebound chamber, a piston bypass valve disposed in the bypass passage and adapted to open when fluid pressure in the compression chamber exceeds the fluid pressure in the rebound chamber by a predetermined compression opening pressure and a check valve adapted to close the bypass passage when the fluid pressure in the rebound chamber exceeds the fluid pressure in the compression chamber.

23. A shock absorber as claimed in claim 1, wherein the compression chamber, the rebound chamber, and the fluid flow paths are substantially filled with fluid, and wherein the reservoir contains fluid and a gas bag having a volume of gas equal to a volume of fluid displaced by the piston rod when fully extended into the inner cylinder.

24. A shock absorber as claimed in claim 1, further comprising the adjusting pin having means to change the adjusting pin location within the bore.

25. A shock absorber as claimed in claim 1, further comprising means for permitting substantially restricted fluid flow between the rebound chamber and the reservoir.

26. An adjustable shock absorber, comprising:

an inner cylinder having a wall, a first end and a second end and defining a cylindrical volume between its first and second ends, the wall having an inner surface;

an outer cylinder having a greater diameter than the inner cylinder and disposed coaxially about the inner cylinder so as to define an annular reservoir between the inner and outer cylinders, the outer cylinder having a first end and a second end, adjacent to the first and second ends, respectively, of the inner cylinder, the second end of the outer cylinder being sealed, the outer cylinder having a wall;

a piston assembly disposed in the inner cylinder and adapted to be reciprocally movable therein, having a piston and with at least a portion of the piston assembly being in a slidable, fluid sealing relationship with the inner surface of the inner cylinder, the piston assembly also serving to divide the cylindrical volume so as to define a compression chamber between the piston assembly and the second end of the inner cylinder and a rebound chamber between the piston and the first end of the inner cylinder, the piston assembly having a bypass passage communicating between the compression chamber and the rebound chamber, a piston bypass valve disposed in the bypass passage and adapted to open when fluid pressure in the compression chamber exceeds the fluid pressure in the rebound chamber by a predetermined compression opening pressure and a check valve adapted to close the bypass passage when the fluid pressure in the rebound chamber exceeds the fluid pressure in the compression chamber;

a piston rod extending from the piston assembly, coaxially with the longitudinal axis of the inner cylinder, beyond the first end of the inner and outer cylinders;

a header for closing the second end of the inner cylinder, the header having a first fluid passage through the header and first valve means for controlling fluid flow through the first passage from the compression chamber to the reservoir when the piston assembly moves through a compression stroke and a second fluid passage through the header and second valve means for controlling fluid flow through the second passage from the reservoir to the compression chamber when the piston assembly moves through a rebound stroke;

a closure extending across the first ends of the inner and outer cylinders, having a centrally disposed aperture therein through which the piston rod may sealingly slide, the closure sealably engaging the wall of the inner cylinder at the first end for preventing the leakage of fluid out of the first end of the inner cylinder into the reservoir, the closure including a first means sealably engaging the wall of the outer cylinder at the first end for preventing the leakage of fluid out of the first end of the outer cylinder, the closure including a second means around the piston rod for preventing the leakage of fluid out of the first end of the outer cylinder as the piston rod moves with the piston assembly, the closure having a threaded bore, the bore having a wall;

a fluid flow path disposed between the rebound chamber and the reservoir permitting fluid communication, the fluid flow path having communication with the bore, the fluid flow path having a jet, the jet having a cross-sectional area;

a damping valve disposed within the fluid flow path adapted to open when the fluid pressure in the rebound chamber exceeds the fluid pressure in the reservoir by a predetermined rebound opening pressure, the rebound opening pressure being variable, the damping valve having a valve seat and an orifice, the orifice having a cross-sectional area;

an adjusting pin having threads adjustably engaging the threads of the bore, the adjusting pin having a spring seat, the adjusting pin including a third means around the adjusting pin for preventing the leakage of fluid out of the first end of the outer cylinder at the bore, the adjusting pin having a first tapered section inserted through the orifice in a fluid metering relationship and defining an orifice cross-sectional flow area, the orifice cross-sectional flow area contemporaneously increasing as the rebound opening pressure of the damping valve is variably decreased, the adjusting pin having a second tapered section inserted through the jet in a fluid metering relationship and defining a jet cross-sectional flow area, the jet cross-sectional flow area contemporaneously increasing as the rebound opening pressure of the damping valve is variably decreased, the jet and the orifice metering fluid from the rebound chamber when the fluid pressure in the rebound chamber both exceeds the fluid pressure in the reservoir and is less than the rebound opening pressure of the damping valve; and a variable spring having one end engaging the spring seat and the other end asserting the variable rebound opening pressure onto the valve seat, the spring being comprised of wire, the wire increasing in outside diameter from one end of the spring to the other.

27. A shock absorber as claimed in claim 26, wherein the compression chamber, the rebound chamber, and the fluid flow paths are substantially filled with fluid, and wherein the reservoir contains fluid and a gas bag having a volume of gas equal to a volume of fluid displaced by the piston rod when fully extended into the inner cylinder.

28. A shock absorber as claimed in claim 26, wherein the closure has an outer surface and further comprises a stop plate mounted to the outer surface of the closure for limiting the travel of the adjusting pin toward the first end.

29. A shock absorber as claimed in claim 26, wherein adjusting pin has a top surface and further comprises indicia on the stop plate and the top surface of the adjusting pin to indicate a level of rebound damping.

30. A shock absorber as claimed in claim 26, further comprising the adjusting pin having means to change the adjusting pin location within the bore.

31. An adjustable shock absorber, comprising:

an inner cylinder having a wall, a first end and a second end and defining a cylindrical volume between its first and second ends, the wall having an inner surface;

an outer cylinder having a greater diameter than the inner cylinder and disposed coaxially about the inner cylinder so as to define an annular reservoir between the inner and outer cylinders, the outer cylinder having a first end and a second end, adjacent to the first and second ends, respectively, of the inner cylinder, the second end of the outer cylinder being sealed, the outer cylinder having a wall;

a piston assembly disposed in the inner cylinder and adapted to be reciprocally movable therein, having a piston and with at least a portion of the piston assembly being in a slidable, fluid sealing relationship with the inner surface of the inner cylinder, the piston assembly also serving to divide the cylindrical volume so as to define a compression chamber between the piston assembly and the second end of the inner cylinder and a rebound chamber between the piston and the first end of the inner cylinder;

a piston rod extending from the piston assembly, coaxially with the longitudinal axis of the inner cylinder, beyond the first end of the inner and outer cylinders;

a header for closing the second end of the inner cylinder; the header having a first fluid passage through the header and first valve means for controlling fluid flow through the first passage from the compression chamber to the reservoir when the piston assembly moves through a compression stroke and a second fluid passage through the header and second valve means for controlling fluid flow through the second passage from the reservoir to the compression chamber when the piston assembly moves through a rebound stroke;

a closure extending across the first ends of the inner and outer cylinder, having a centrally disposed aperture therein through which the piston rod may sealingly slide, the closure sealably engaging the wall of the inner cylinder at the first end for preventing the leakage of fluid out of the first end of the inner cylinder into the reservoir, the closure including a first means sealably engaging the wall of the outer cylinder at the first end for preventing the leakage of fluid out of the first end of the outer cylinder, the closure including a second means around the piston rod for preventing the leakage of fluid out of the first end of the outer cylinder as the piston rod moves with the piston assembly;

a fluid flow path disposed between the rebound chamber and the reservoir permitting fluid communication;

a damping valve disposed within the closure member and within the fluid flow path and adapted to open when the fluid pressure in the rebound chamber exceeds the fluid pressure in the reservoir by a predetermined rebound opening pressure; and variable rebound damping means for varying the rebound opening pressure of the damping valve.

* * * * *